May 23, 1961 H. HAUPTVOGEL ET AL 2,985,067
ENLARGEMENT INDICATORS FOR PHOTOGRAPHIC
ENLARGING AND REPRODUCING APPARATUSES
Filed Nov. 13, 1957 2 Sheets-Sheet 1

INVENTORS
HERBERT HAUPTVOGEL
ERICH KORF
BY

ATTORNEY

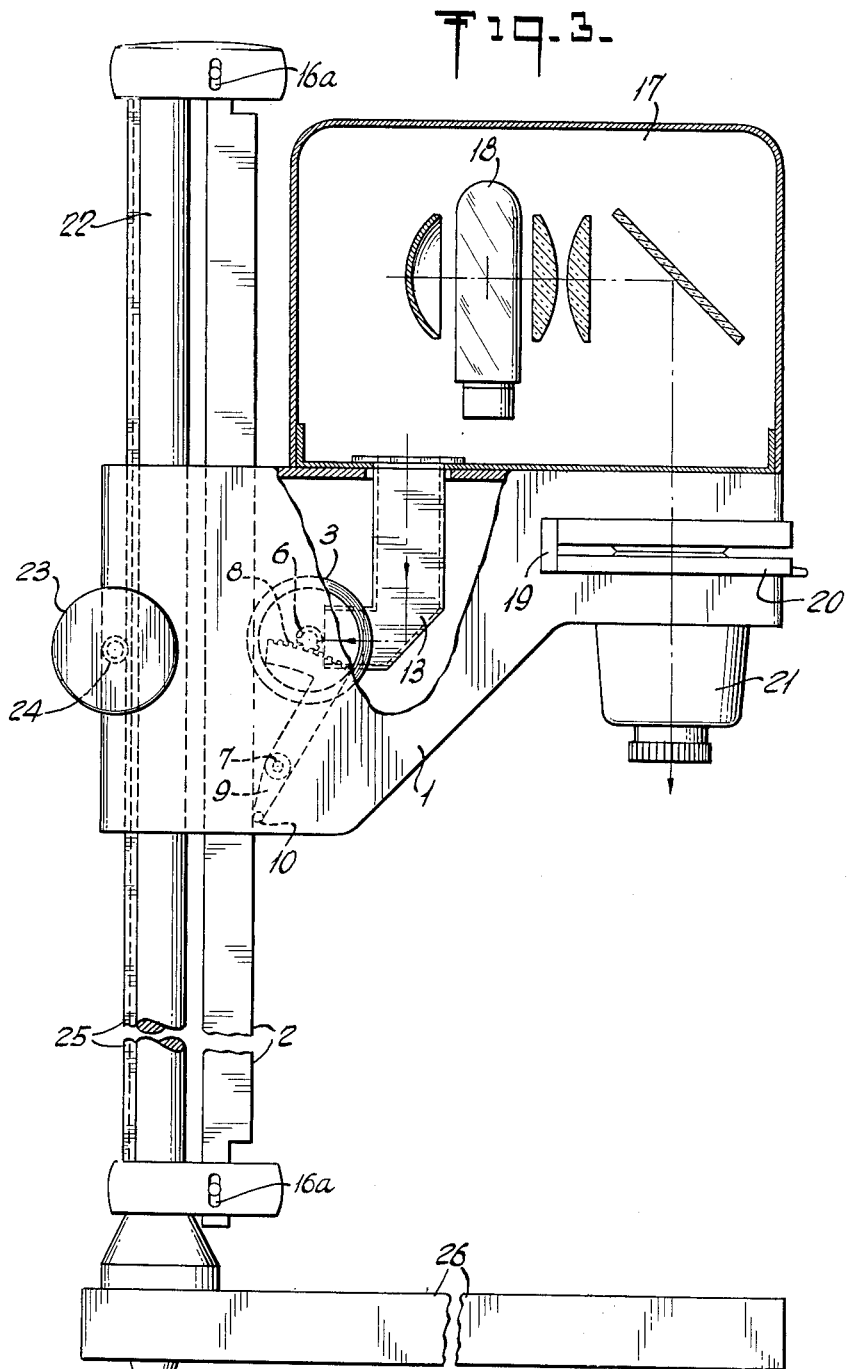

United States Patent Office 2,985,067
Patented May 23, 1961

2,985,067

ENLARGEMENT INDICATORS FOR PHOTOGRAPHIC ENLARGING AND REPRODUCING APPARATUSES

Herbert Hauptvogel and Erich Korf, Dresden, Germany, assignors to VEB Kamera-und Kinowerke Dresden Filed Nov. 13, 1957, Ser. No. 696,280

Claims priority, application Germany Dec. 14, 1956

8 Claims. (Cl. 88—24)

This invention relates to an arrangement for automatic indication of the scale of an adjusted enlargement or the enlargement factor in photographic enlarging and reproducing apparatuses.

Enlarging apparatuses of different types are known, in which the adjusted enlargement can be read with the aid of a special device on a scale provided with a pointer or an index. The scale is secured to the standard of the apparatus and extends lengthwise over the total range of adjustment of the enlarging system whose supporting member is provided with a pointer or index by means of which the adjusted enlargement is indicated on the scale. In another construction the arrangement for indicating the enlargement comprises a separate device disposed on the base plate of the enlarger and connected with a parallelogrammatic guide which causes vertical adjustment of the enlarger by means of a string drive. In still other known enlarging apparatuses the pointer indicating the enlargement is arranged at the joining point of the parallellogrammatic guide and the scale is arranged within the range of this point.

All these known arrangements have in common that for the indicator and the enlargement scale either no lighting is provided or the lighting is only in the form of a special built-in or added light source. The light source serving the enlarging system usually requires a higher voltage than the light source for the scale and pointer indicating the enlargement so that two feed lines with different voltages and possibly with an interposed transformer are needed. The provision of a longitudinal scale on the standard of the enlarging system or of a segmental scale on the parallelogrammatic guide involves also the disadvantage that due to the vertical guiding of the enlarging system, disturbing shadows and reflexes may appear which—in connection with the unavoidable parallax—interfere with easy and accurate reading. Furthermore, these known enlarging apparatuses do not permit compensation of the differences between indicated and actual enlargement, inevitable when enlarging frames of different heights are selectively used.

The invention proposes to provide an enlargement indicating arrangement in which the enlargement indicator is illuminated not by an additional light source but by the lighting system or light source of the enlarging system itself and the enlargement indicator is so arranged and controlled that troublesome shadows and reflexes are avoided. Furthermore, the scale can be adjusted in a simple manner to enlarging frames of different heights.

According to the invention, the light emitted by the lighting system or other light source of the enlarging system passes through mechanical or optical means to a light-permeable dial which is preferably arranged in an enclosed case on the supporting member of the enlarging system and controlled during vertical adjustment by a rail disposed on the standard. This control rail can be longitudinally adjusted to compensate the difference due to the use of enlarging frames of different heights.

The arrangement suggested by the invention does not require any additional light source and/or provision of the necessary feed lines, connections and transformation of voltages since the enlarger lighting system itself ensures sufficient lighting of the indicator and also provides parallax-free readings without disturbing shadows and/or reflex phenomena. It is further possible to compensate in a simple manner the differences caused by the use of enlarging frames of various heights and to obtain accurate indications of the rate of enlargement.

The accompanying drawings diagrammatically show one embodiment of the invention.

In the drawings,

Fig. 3 is a side view of the enlarging apparatus fitted with the enlargement indicator shown in Figs. 1 and 2.

Figure 1:
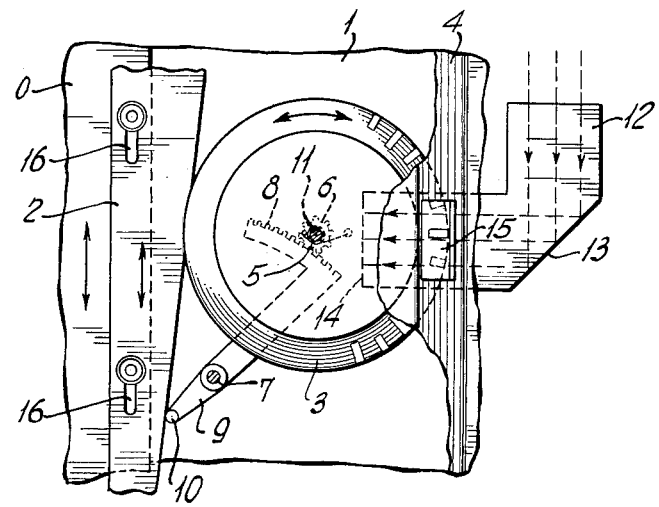
Fig. 1 is a partial side view of an enlargement indicator according to the present invention, showing the gear box or housing of the photographic enlarging apparatus.
Figure 2:
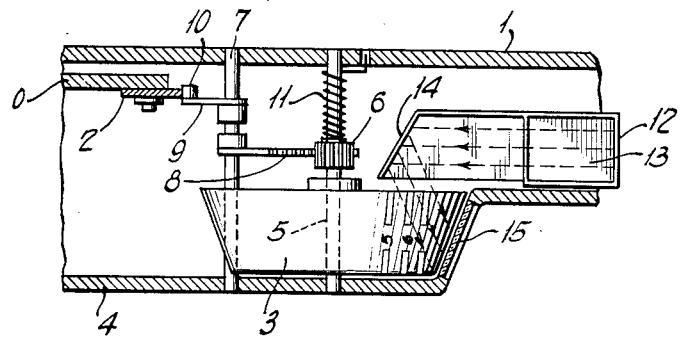
Fig. 2 is a partly sectional top view thereof.

A gear box or housing 1 forms part of the enlarging apparatus (Fig. 3), which comprises a lamp house 17 containing a suitable light source 18, a negative support 19 with a negative carrier 20 inserted therein, and the optics 21. The enlarging system is movable as a unit in vertical direction along a standard 22 secured to a base plate or supporting member 26 of the apparatus. A hand wheel 23 is provided on the housing 1, engaging with an associated pinion 24 a toothed rack attached to the standard 22, in a manner conventional in enlarging apparatus of this type. To a holder 0 mounted on the standard 22 a control rail 2 is secured; the housing 1 carries a scale drum 3 which has the form of a truncated cone and consists of light-permeable material, the peripheral surface of the drum being provided with a scale 4 corresponding to the respective enlargement values. The drum 3 is firmly connected with a shaft 5 provided with a pinion 6. The shaft 5 is supported by the walls of the housing 1 and so is a shaft 7 to which a toothed segment 8 and a control lever 9 are secured; the latter is fitted with a slide roller 10. Around the shaft 5 a torsion spring 11 is arranged which is connected on one side to the wall of housing 1 and on the other side to the pinion 6 in such manner that the driving gear comprising the toothed segment 8 and the control lever 9 is pressed with the slide roller 10 against the control rail 2, while the spring 11 simultaneously compensates play.

The drum 3 is lighted by the lighting system 18 of the enlarging apparatus whose light is transmitted to the drum 3 in the direction of an arrow by a light shaft 12 and its angular prismatic faces 13, 14 from the rear and the sides. The illuminated scale can then be viewed through a window 15 of the housing 1. Instead of this arrangement other optical means, such as suitably made prisms or the like, may be used for transmitting light.

During the vertical adjustment of the enlarging system for changing and setting the desired enlargement, the control lever 9 slides with its roller 10 along the control rail 2 disposed on the standard 22, and the rail by its contoured edge imparts to the lever 9 a corresponding movement which is transmitted to the scale drum 5 by the tooth segment 8 and pinion 6 so that it renders the enlargement ratio visible on the scale divisions 4 readable through window 15.

When enlarging frames of different heights are used on the base 26, a corresponding difference would appear in the indication of the scale 4. This is compensated according to the invention by the control rail 2 held on the standard 22 by the holder 0 and reciprocable in the direction of the vertical adjustment. For this purpose the control rail 2 may be adjustably arranged with a slotted guide 16, 16', or in other suitable manner, about the holder 0 and adjusted by clamping means, threaded spindles or other suitable means. In this simple manner, even if frames of different heights are employed, the indicated enlargement will always correspond to the actual enlargement.

We claim:

1. In a photographic reproduction apparatus having a fixed vertical standard, a housing slidably mounted on said standard, an enlargement indicator for displaying the relative positions of the standard and the housing and thereby the degree of enlargement, said indicator comprising a control rail secured to said standard and having an oblique surface, a control lever pivotally mounted on said housing, said control lever having a follower arm engageable with said surface of said control rail and a second arm having a gear segment, a pinion mounted on said housing and in engagement with said gear segment, resilient means mounted on said housing biasing said pinion in a direction causing engagement of said follower arm with said surface of said control rail, a translucent drum mounted in said housing and rotatable with said pinion, markings on the periphery of said drum, means mounted on said housing for reflecting light from said housing toward said markings for illuminating said markings, and a window disposed in said housing adjacent said drum for viewing said markings.

2. In a photographic apparatus as set forth in claim 1, means on said standard and on said control rail for adjusting said control rail to a plurality of positions on said standard, whereby the reading of said drum may be adjusted.

3. In a photographic apparatus as set forth in claim 1, a plurality of locking members on said standard, a plurality of slots on said rail for receiving said locking members and allowing locking of said rail in a plurality of positions.

4. In a photographic apparatus as set forth in claim 1, clamp means on said standard, a slot in said rail for receiving said clamp means for adjustably securing said rail to said standard in a plurality of positions.

5. An enlargement indicator for photographic enlargers wherein a lamp housing is mounted for movement along a vertical carrier rod and the relative motion of the housing to the rod is a measure of the degree of enlargement comprising, a drum rotatably mounted on said housing and having scale markings indicative of the degree of enlargement, means on said housing for reflecting light from a light source inside said housing upon the scale markings, means in said housing for viewing the scale markings, a member on said carrier rod having an oblique surface constituting a cam surface, a follower mechanism on said housing engaging said surface so as to respond to movement of the housing relative to said carrier rod, said follower mechanism being connected with said drum for rotation thereof in response to movement of said housing whereby the degree of enlargement is indicated by said scale markings.

6. In a photographic enlarging apparatus having a stationary supporting rod and a lamp housing mounted on said rod for movement therealong, an indicator arrangement for displaying the relative position of the housing on the supporting rod and comprising: a gear box forming a part of said housing, an elongated control rail secured to said rod and having a surface at an acute angle to the path of said housing on said rod, a rocker lever pivotally mounted in said gear box, said lever having a first arm engaging said surface on said control rail, and a second arm projecting toward said housing, a geared segment fixedly mounted on said second arm for movement therewith, a pinion gear rotatably mounted in said gear box, a drum fixed to said pinion for rotation therewith and having markings thereon, a window in said gear box adjacent said markings for viewing said markings, a mirror system in said gear box for illuminating said markings, and means in said gear box for biasing said first arm into engagement with said surface.

7. In a photographic reproduction apparatus having a vertical standard, a housing mounted on said standard for sliding along said standard and illuminating means mounted in said housing, the provision of an enlargement indicator comprising: a control rail shiftably secured to said standard and having a surface at an acute angle to the vertical, a control lever pivotally mounted on said housing, means biasing said control lever against the contour of said control rail, rotary indicating means on said housing to indicate the angular position of said lever, said indicating means being provided with indicia depicting various enlargement values, means on said housing operatively connected to said control lever for rotating said indicating means according to the sliding movement of said housing, prismatic reflecting means mounted on said housing for transmitting light from said illuminating means to said indicating means, and a window in said housing for viewing said indicia.

8. In a photographic reproduction apparatus having a lamp-house guiding and supporting member, a projector housing slidably mounted on said member, a drum rotatably mounted within said housing, means on said housing for rotating said drum, said means being connected to said member and responsive to movement of said housing with respect to said member so as to rotate said drum according to said movement, markings on the periphery of said drum for indicating enlargement values, a window in said housing disposed adjacent said drum for viewing said markings, and means mounted on said housing for deviating light from within said housing toward said drum.

References Cited in the file of this patent

UNITED STATES PATENTS

| | | |
|---|---|---|
| 2,188,622 | Cantor | Jan. 30, 1940 |
| 2,718,816 | Loeck | Sept. 27, 1955 |

FOREIGN PATENTS

| | | |
|---|---|---|
| 527,977 | Great Britain | Oct. 21, 1940 |
| 549,786 | Germany | Apr. 14, 1932 |
| 695,853 | Germany | Sept. 4, 1940 |
| 705,413 | Germany | Mar. 20, 1941 |
| 848,852 | France | Aug. 7, 1939 |
| 898,804 | France | July 17, 1944 |
| 992,455 | France | July 11, 1951 |